J. GREFE.
TRACTOR WHEEL.
APPLICATION FILED DEC. 30, 1919.

1,363,317. Patented Dec. 28, 1920.

Witness

Inventor
John Grefe
by Frank C. Gore
his Attorney

UNITED STATES PATENT OFFICE.

JOHN GREFE, OF EVANSVILLE, INDIANA.

TRACTOR-WHEEL.

1,363,317.   Specification of Letters Patent.   Patented Dec. 28, 1920.

Application filed December 30, 1919. Serial No. 348,470.

*To all whom it may concern:*

Be it known that I, JOHN GREFE, a citizen of the United States, residing at Evansville, in the county of Vanderburgh and State of Indiana, have invented certain new and useful Improvements in Tractor-Wheels, of which the following is a specification.

My object is to provide an improved wheel for tractors which will be provided with a novel tread and hooks or cleats, and openings through the tread for the passage through the tread of the dirt which is kicked up and, further, to prevent slipping and to loosen up the bottom of the furrow.

A further object is the provision of an annular flange combined with the hooks or cleats in an improved manner to prevent them from being damaged when the wheel passes over hard surfaces, such as bridges and rock-ballasted roads.

A still further object is to provide, in connection with a wheel having hooks or cleats and openings for the passage of the dirt through the rim, an improved inner dirt-discharging rim which causes the dirt forced through the openings to fall out laterally from the wheel.

Figure 1:
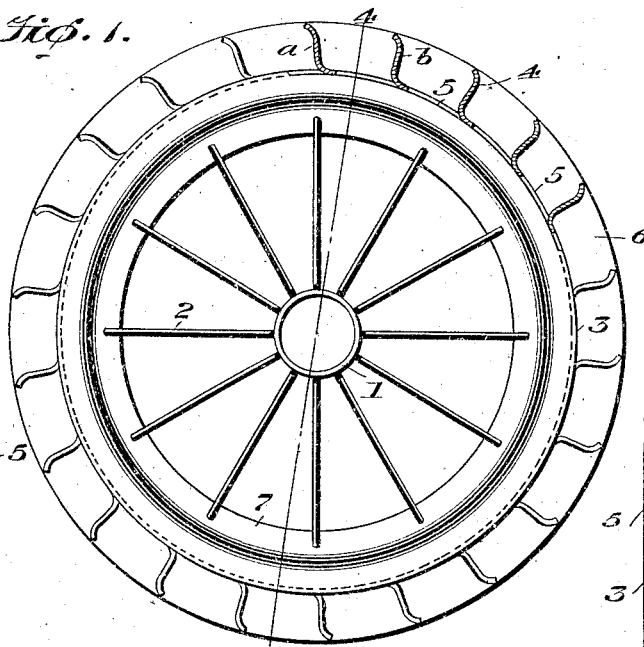
Figure 3:
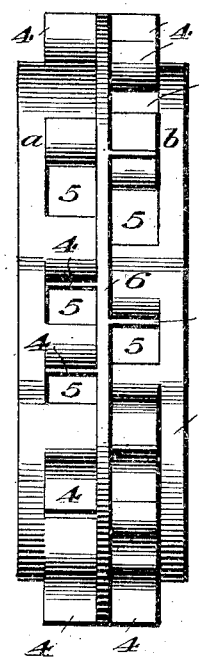
Figure 2:
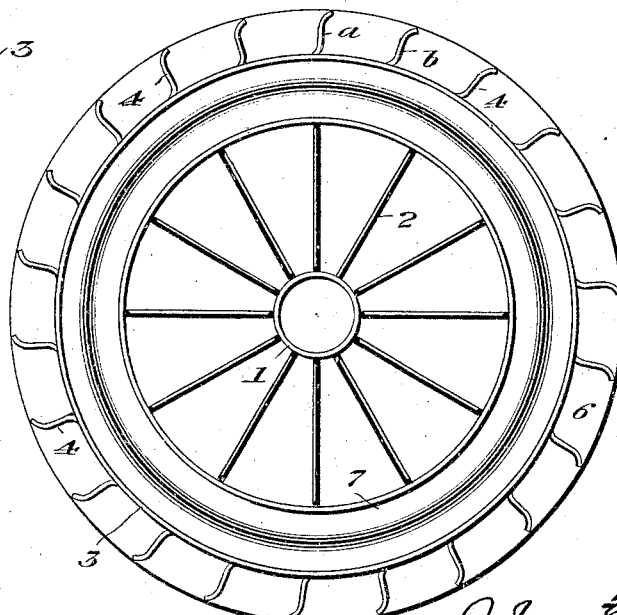

These, and other objects not specifically mentioned, are accomplished by the provision of an improved wheel which is fully set forth hereinafter and shown in the accompanying drawings in which, Figures 1 and 2 are opposite side elevations;

Fig. 3, a view looking toward the tread; and

Figure 4:
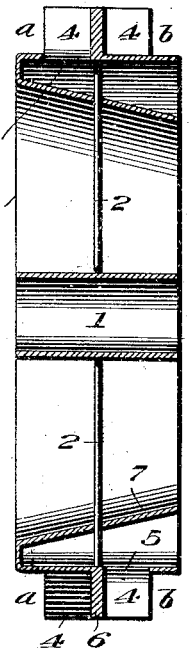

Fig. 4, a cross section on line 4—4 of Fig. 1.

The wheel has the usual hub 1, spokes 2 and a rim 3 which is of improved construction, The rim 3 is of metal provided with struck-up hooks or cleats 4 which are curved and overhang the openings 5 in the rim which are provided by striking up cleats. The cleats are arranged in two series, $a$ and $b$, the cleats of one series alternating with those of the other series. Secured to or formed integral with the rim is an annular flange 6 which lies between the series of cleats $a$, $b$. The flange 6 prevents injury to the cleats or hooks when the wheel is passing over a bridge or rock-ballasted road or hard surface.

The curved cleats 4 overhanging the openings 5 force the kicked up dirt through said openings 5, thus overcoming what has heretofore been a serious defect in traction wheels, to-wit, packing of the dirt around the cleats. The openings 5, by reason of their adaptability to void the loosened dirt, enable the cleats or hooks 4 to very satisfactorily loosen up the bottom of the furrow and to take a firm bite, so that my wheel has little liability to slip and also acts as a furrow loosener.

For the purpose of discharging the dirt which passes through the openings 5 to the inner face of the rim, I provide an annular inner or false rim 7 which may be integral with the rim 3, or secured thereto. This false or inner rim is adapted to discharge the dirt laterally from the upper part of the wheel.

What I claim is:

1. A tractor wheel provided with a rim having openings therethrough and cleats which overhang said openings.

2. A tractor wheel provided with a rim having struck-up cleats which overhang the openings provided by the striking-up of said cleats.

3. A tractor wheel whose rim is provided with two series of cleats and an intermediate annular flange or rim, there being provided openings through the rim adjacent the cleats.

4. A tractor wheel whose rim is provided with two series of cleats and an intermediate annular flange or rim, there being provided openings through the rim adjacent the cleats, said cleats overhanging the aforesaid openings for the purpose of causing the dirt to pass through the openings.

In testimony whereof I affix my signature.

JOHN GREFE.